United States Patent
Emery et al.

[11] Patent Number: 5,904,390
[45] Date of Patent: May 18, 1999

[54] BEDLINER WITH POCKETS FOR LOAD RESTRAINT

[75] Inventors: Philip L. Emery, Portage; William L. Dresen, Baraboo, both of Wis.

[73] Assignee: Penda Corporation, Portage, Wis.

[21] Appl. No.: 09/113,725

[22] Filed: Jul. 10, 1998

Related U.S. Application Data

[62] Division of application No. 08/584,992, Jan. 11, 1996, Pat. No. 5,788,309, which is a continuation of application No. 08/242,592, May 12, 1994, abandoned.

[51] Int. Cl.⁶ .............................. B62D 33/02; B60P 1/64
[52] U.S. Cl. .................. 296/39.1; 296/39.2; 410/144; 410/152; 403/263; 403/361
[58] Field of Search .................. 296/39.1, 39.2; 410/142, 144, 145, 152; 403/263, 361; 248/239, 224.8; D12/98; 211/182

[56] References Cited

U.S. PATENT DOCUMENTS

| | | | |
|---|---|---|---|
| 2,042,880 | 10/1936 | Parkin | 211/182 |
| 2,243,370 | 5/1941 | Bell | 211/182 |
| 4,037,813 | 7/1977 | Loui et al. | |
| 4,053,132 | 10/1977 | Del Pozzo | |
| 4,245,863 | 1/1981 | Carter | |
| 4,333,678 | 6/1982 | Munoz et al. | |
| 4,767,149 | 8/1988 | Rye | |
| 4,860,913 | 8/1989 | Bertolini | 410/145 |
| 4,906,040 | 3/1990 | Edwards | 296/39.2 |
| 5,240,301 | 8/1993 | Arnold | 296/39.2 |
| 5,370,436 | 12/1994 | Martindale et al. | 296/39.2 |
| 5,415,506 | 5/1995 | Payne | 410/129 |
| 5,720,507 | 2/1998 | Emery | 296/39.2 |

FOREIGN PATENT DOCUMENTS

| | | | |
|---|---|---|---|
| 2317809 | 10/1974 | Germany | 410/144 |
| 3627535 | 8/1986 | Germany | |
| 402216371 | 8/1990 | Japan | 410/144 |

OTHER PUBLICATIONS

"FlipLiner" Buddy Plastics Division, Anderson Tank Manufacturing Co.

*Primary Examiner*—Dennis H. Pedder
*Attorney, Agent, or Firm*—Lathrop & Clark LLP

[57] ABSTRACT

A thermoformed thermoplastic truck bedliner has at least one pair of under-cut load restraint pockets formed by portions of opposed bedliner sidewalls. The pockets are recessed from the sidewall so that a load restraining member such as a 2×4 beam may be pressed downwardly to be snapped into engagement with the pockets. The pockets support the boards in a horizontal orientation, with the wide dimension of the board extending from front to back within the liner to give greater board stiffness against loads shifting from front to back. The pockets may be formed in either under the rail bedliners or in over the rail bedliners. In an alternative embodiment, each under-cut pocket is formed in a cross shape such that a board may be positioned horizontally or vertically.

7 Claims, 19 Drawing Sheets

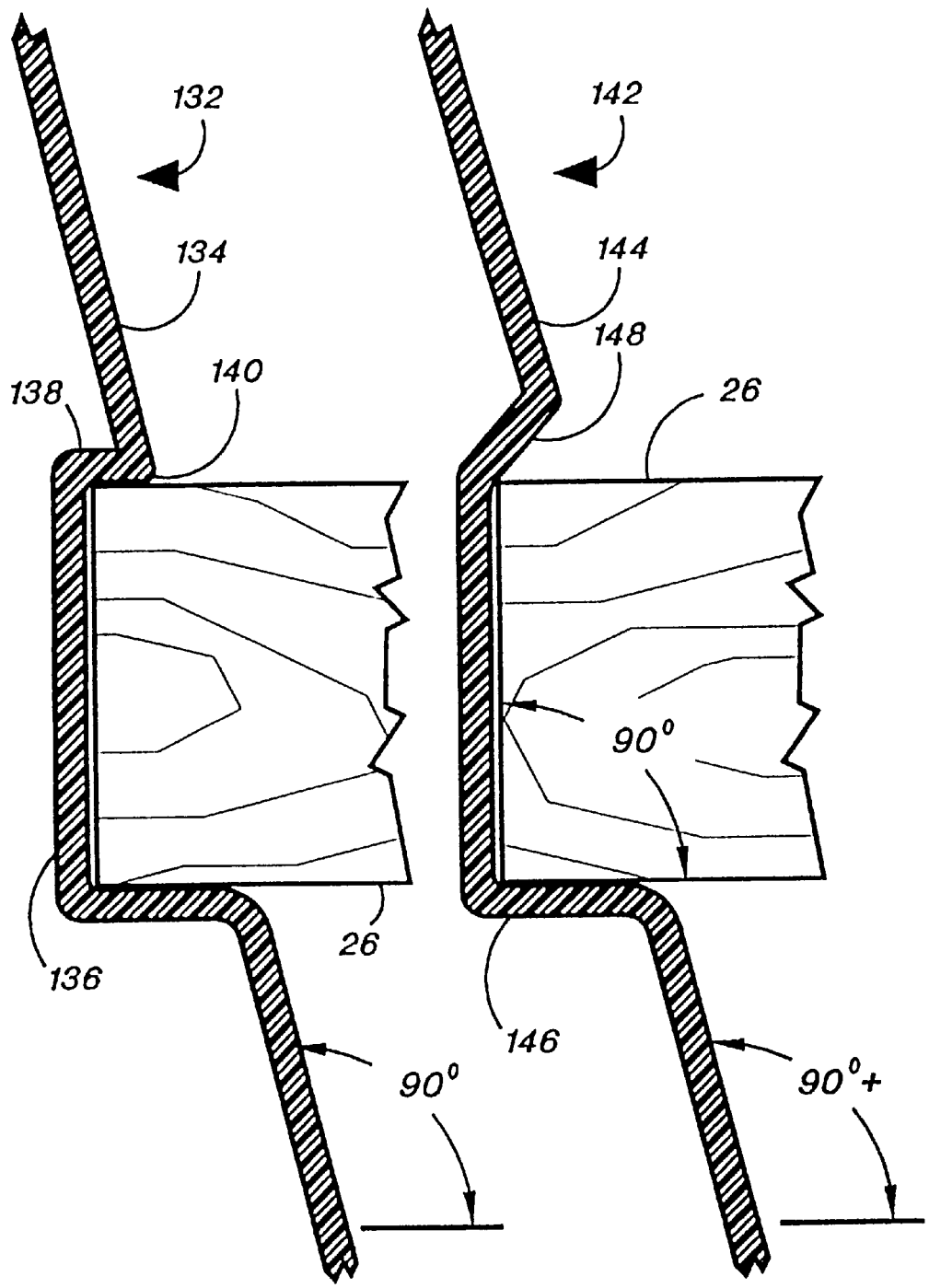
FIG. 12  FIG. 13

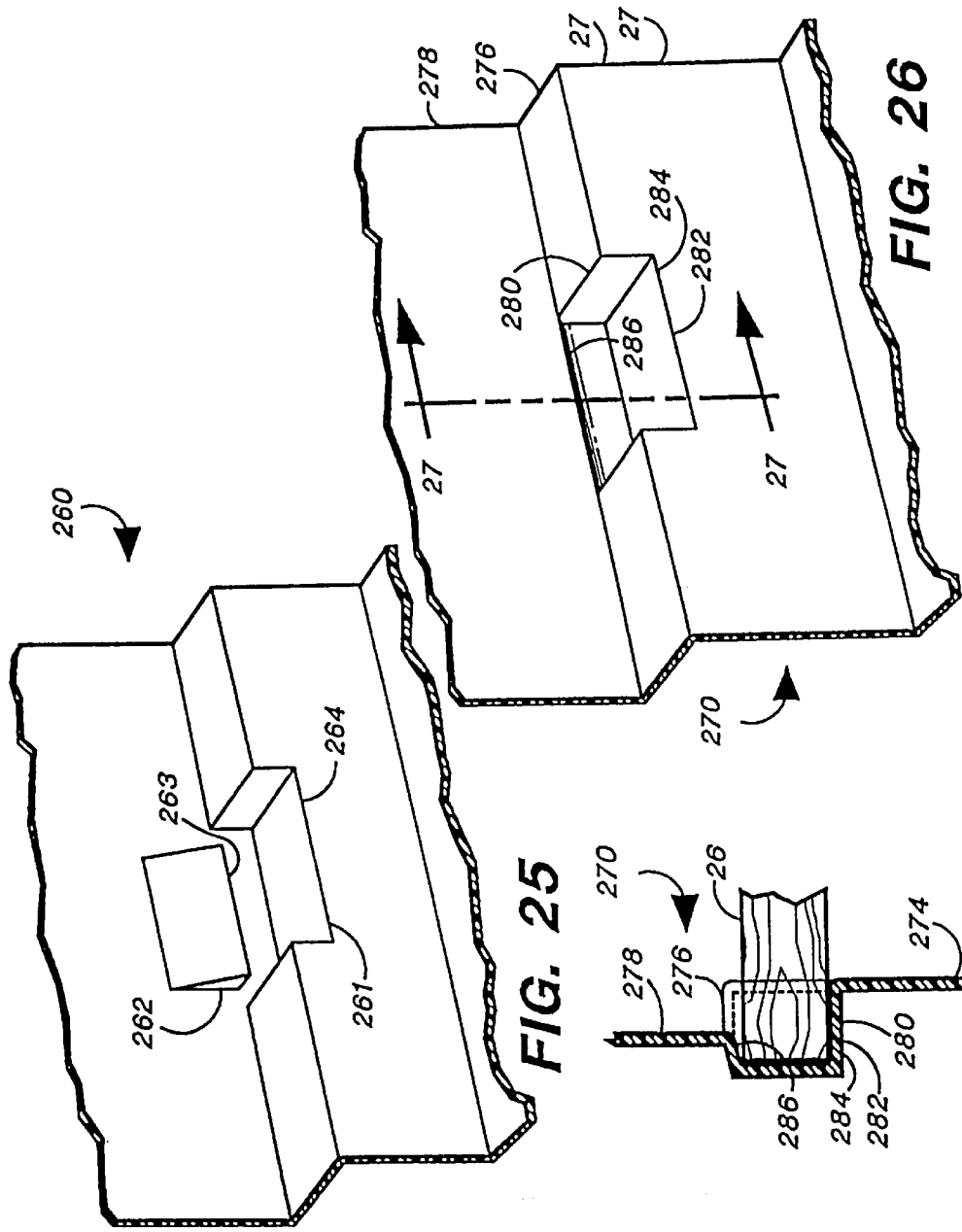

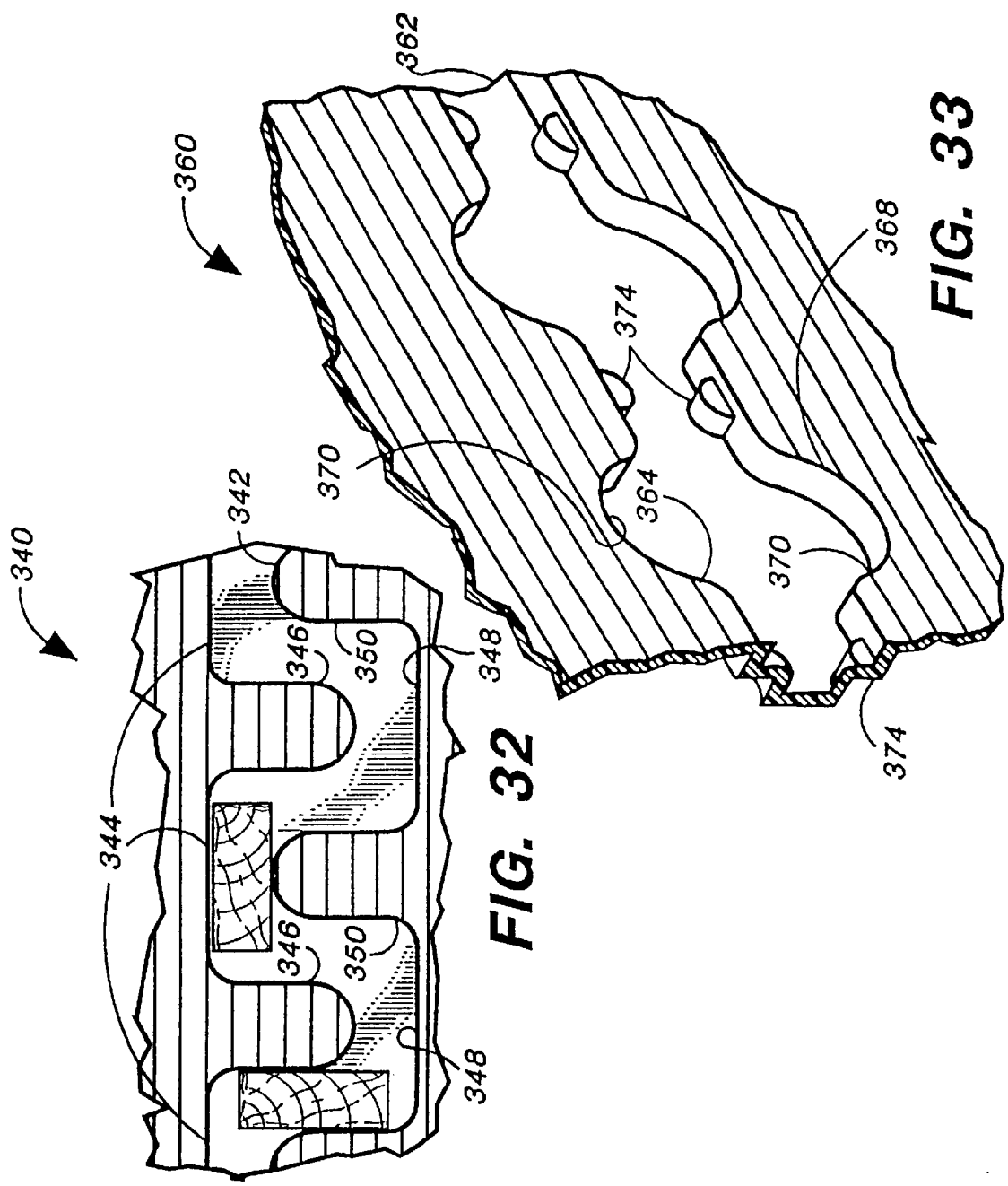

BEDLINER WITH POCKETS FOR LOAD RESTRAINT

CROSS REFERENCE TO RELATED APPLICATIONS

This application is a divisional of applicatoin Ser. No. 08/584,992, filed Jan. 11, 1996, now U.S. Pat. No. 5,788,309, which is a continuation of application Ser. No. 08/242, filed May 12, 1994, now abandoned, the disclosures of both application being incorporated by reference herein.

BACKGROUND OF THE INVENTION

This invention relates to thermoformed thermoplastic truck bedliners in general and to bedliners with structure for engaging load restraing members in particular.

Although long used in agricultural and commercial applications, pick-up trucks with open cargo beds have also become increasingly popular as personal and family vehicles. The commercial vehicle owner, although concerned with performnance and cost effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a "like new" condition as possible.

Truck bedliners of plastic or rubber are commonly employed to protect the pick-up truck cargo bed. These truck bedliners are available in a wide variety of configurations to suit the wide variety of available trucks. One-piece thermoformed thermoplastic truck bedliners provide a cost effective means of protecting the truck cargo bed.

To facilitate the handling of cargo, many truck cargo boxes have features which stabilize and control shifting of cargo in the truck box. For instance, the box may have stake holes along the upper peripheral edges so that boards may be inserted into the sides of the truck box, so extending the sides to retain light-weight, high-volume loads. Some truck boxes have supports on the side walls for horizontal boards, so that wide loads may be supported above the interiorly extending truck wheel wells on horizontal boards.

Some trucks have features formed into the sides of the truck to support a plank or "2×4" board so it extends upright across the width of the bed. Boards extending across the floor of the bed of the cargo box are useful to prevent the shifting of cargo as the truck accelerates and brakes.

Truck bedliners have been developed which extend existing features in truck cargo boxes and which provide features such as horizontal board pockets for use in truck boxes that lack them. For instance, one type of truck bedliner provides a series of board slots formed by vertical ribs which extend into the interior of the cargo box. These series of board slots allow a vertical 2×4 board to be adjustably positioned among the slots to secure the load into place.

Bedliners come in two general types, so-called "over-the-rail" liners which extend up and cover the upper edges of the cargo box, and so-called "under-the-rail" liners in which side-walls of the liner terminate under the upper flanges or rails of the cargo box.

Board holder pockets have been used for a number of years to support boards horizontally to prevent shifting of cargo. Board holder pockets, however, open upwardly, and hence retain the possibility that a board held therein may be rotated or shifted out of the pocket if subjected to an upwardly-directed force.

A thermoformed truck bedliner is needed which will accept commonly sized timbers to extend across the truck bed and which will support the timbers against loads applied by shifting cargo.

SUMMARY OF THE INVENTION

The thermoformed thermoplastic truck bedliner of this invention has at least one pair of under-cut load restraint pockets formed by portions of opposed bedliner sidewalls. The pockets are recessed from the sidewall so that a load restraining member such as a 2×4 beam may be pressed downwardly to be snapped into engagement with the pockets. The pockets support the boards in a horizontal orientation, with the wide dimension of the board extending from front to back within the liner to give greater board stiffiness against loads shifting from front to back. The pockets may be formed in either under the rail bedliners or in over the rail bedliners.

Snap-in pockets may be formed in a variety of shapes, for example, cylindrical, rectangular, oval, and cross-shaped to receive boards in two orientations.

It is an object of the present invention to provide a truck bedliner which will support load restraining members in a secure fashion.

It is also an object of the present invention to provide a truck bedliner which holds load restraining members in such a way to restrain tipping or tilting of the members.

It is an additional object of the present invention to provide a truck bedliner allowing multiple height positioning of load restraining members.

Further objects, features, and advantages of the invention will be apparent from the following detailed description when taken in conjunction with the accompanying drawings.

BRIEF DESCRIPTION OF THE DRAWINGS

FIGS. 12–19 are cross-sectional views of bedliner side wall segments and load restraining members received therein.

FIG. 25 is a fragmentary isometric view of another alternative embodiment bedliner of this invention.

FIG. 26 is a fragmentary isometric view of yet another alternative embodiment bedliner of this invention.

FIG. 27 is a cross-sectional view taken along section liner 27—27 of the bedliner of FIG. 26.

FIG. 32 is a fragmentary elevational view of the side wall of an alternative bedliner of this invention having a multiple position board holder pocket.

FIG. 33 is a fragmentary isometric view of the side wall of an alternative embodiment bedliner of this invention having a series of aligned two-position board holder structures within a single pocket.

DESCRIPTION OF THE PREFERRED EMBODIMENTS

Figure 1:
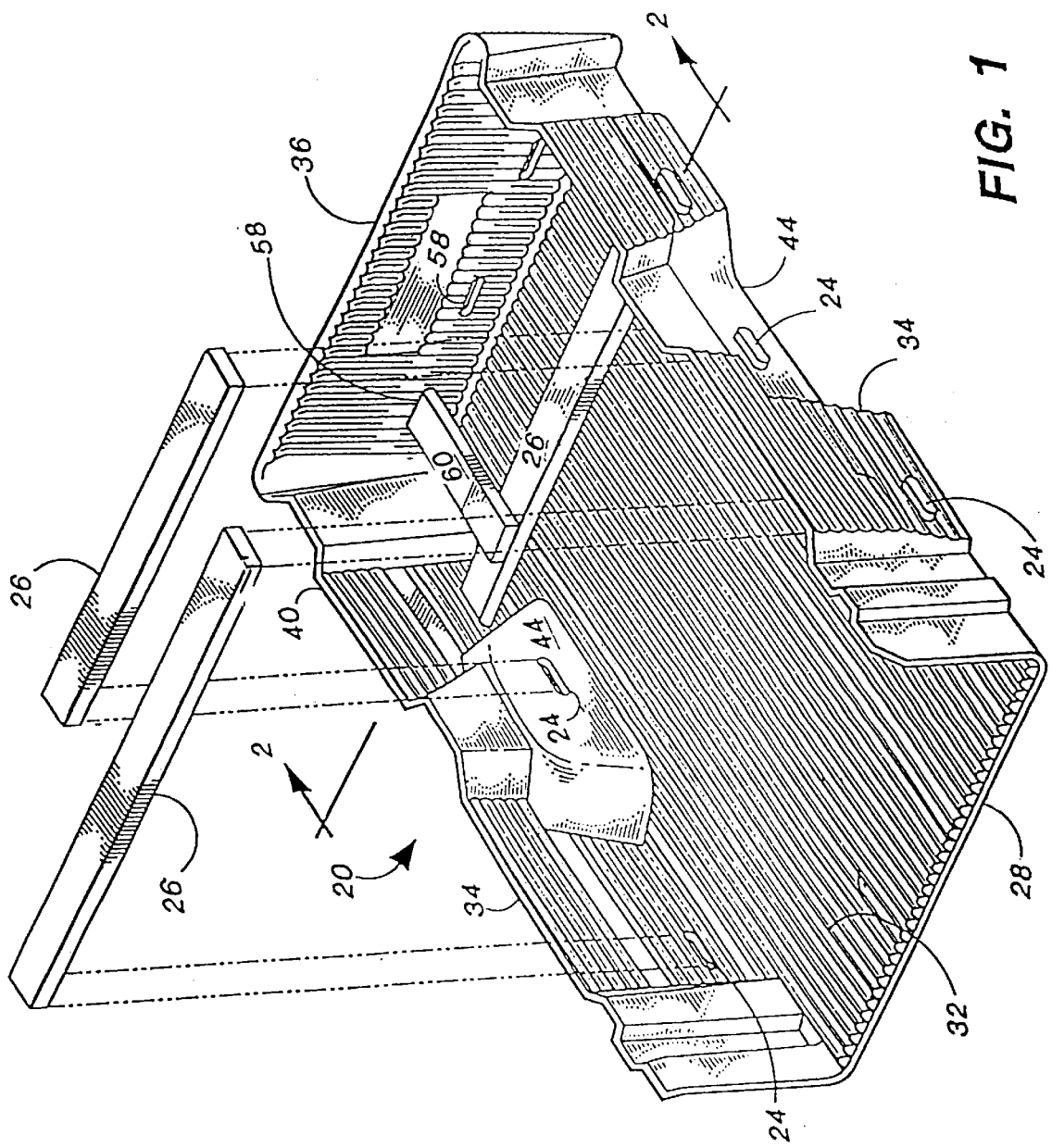
FIG. 1 is an isometric view of an under the rail truck bedliner of this invention with load restraining members exploded above their load restraining positions.

Referring more particularly to FIGS. 1–33, wherein like numbers refer to similar parts, an under the rail bedliner 20 is shown in FIGS. 1–5 which may be installed within the cargo bed of a conventional pick-up truck (not shown) and attached in any known manner. The bedliner 20 has two pairs of load restraint pockets 24. The restraint pockets are integrally molded in the bedliner 20 and engage with a load restraining member 26 to facilitate the handling of shiftable or large cargo payloads.

The bedliner 20 is formed through a single sheet thermoforming process and is formed from thermoplastic sheet stock such as one-quarter inch thick high density polyethylene. In the thermoforming process a one-sided thermoforming vacuum mold has a plurality of vacuum ports through which air is drawn to draw a heated thermoplastic sheet against the mold to form the sheet in general conformity to the shape of the mold.

The bedliner 20 has a bottom wall 28 which overlies and covers the truck cargo bed floor. The bedliner bottom wall 28 extends generally in a horizontal plane. However, it is preferably provided with a series of inverted U-shaped longitudinal ribs 32 which contribute to the rigidity of the bottom wall.

Two side walls 34 extend upwardly from the bedliner bottom wall 28 and are inclined from the liner bottom wall at an angle greater than perpendicular, preferably an angle of up to twelve degrees outwardly from vertical. The side walls 34 are joined at the front of the bedliner by a liner front wall 36, shown in FIG. 1, which extends upwardly from the bedliner bottom wall 28. The bedliner side walls 34 are positioned against the interior of the truck cargo bed side walls and serve to shield and protect the truck side walls from soiling and damage. Each bedliner side wall 34 has an upper margin 40 which engages against a truck cargo bed side wall beneath a truck bed side rail.

Figure 2:
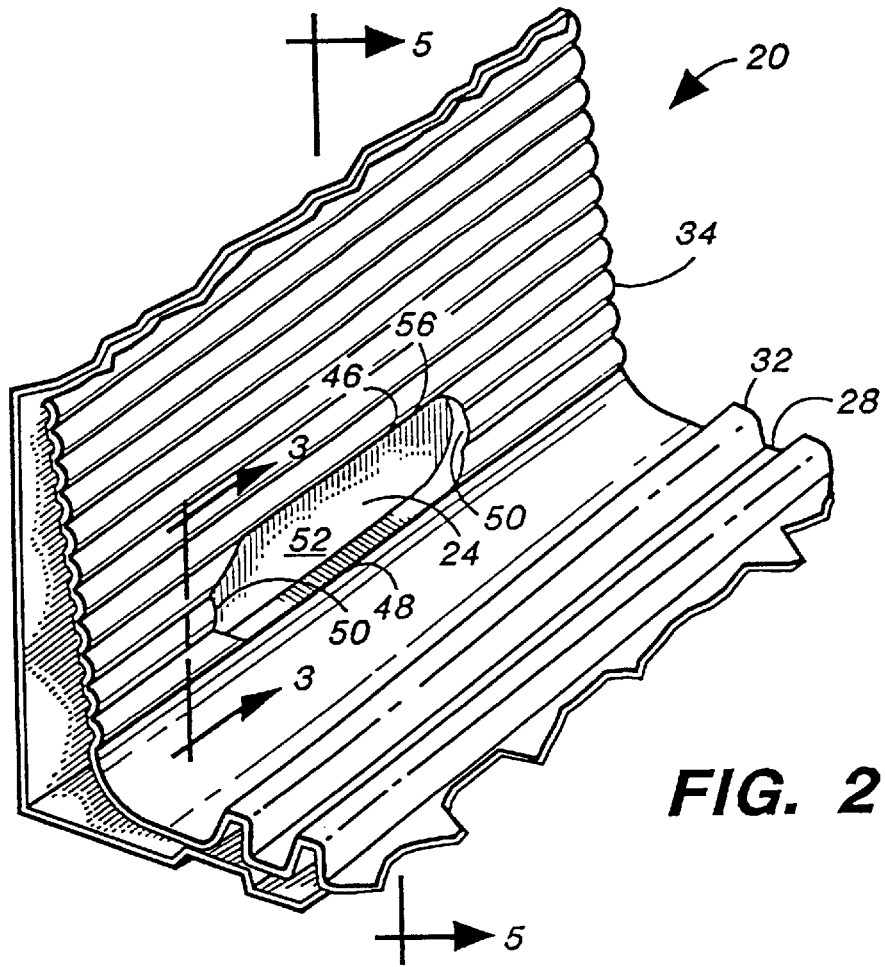
FIG. 2 is a fragmentary isometric view of a portion of the side wall of the bedliner of FIG. 1 showing a single pocket.
Figure 3:
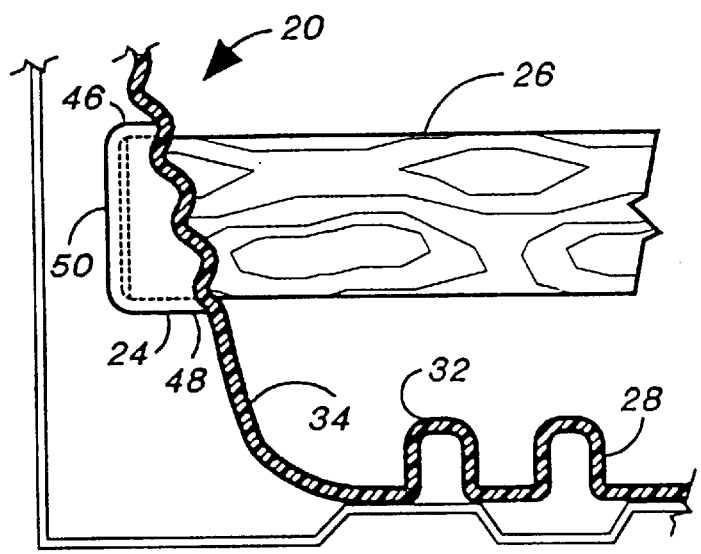
FIG. 3 is a cross-sectional view of the bedliner of FIG. 2 taken along section line 3—3 showing an inserted load restraining member.
Figure 4:
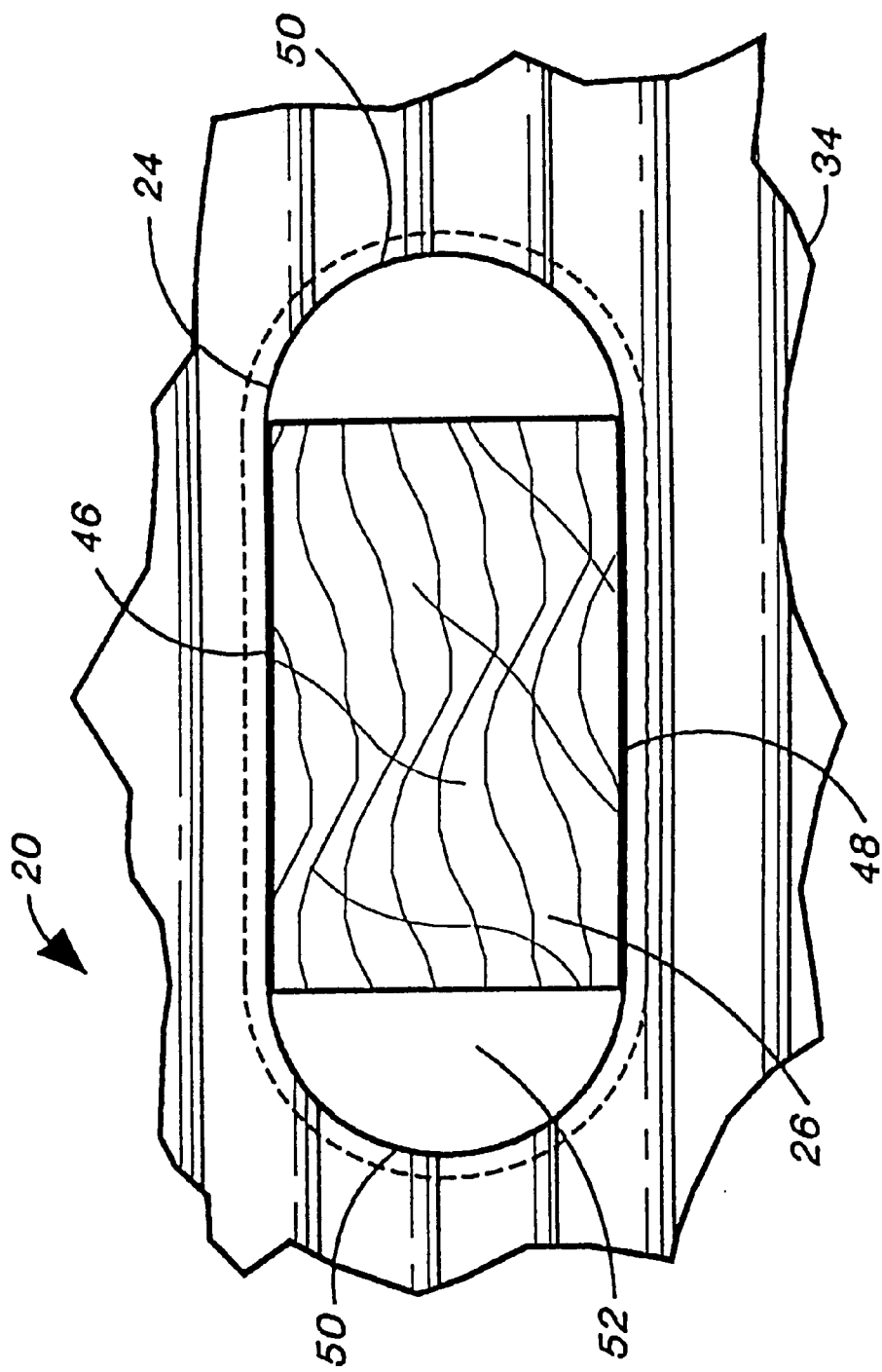
FIG. 4 is a fragmentary elevational view of the bedliner side wall of FIG. 3.
Figure 5:
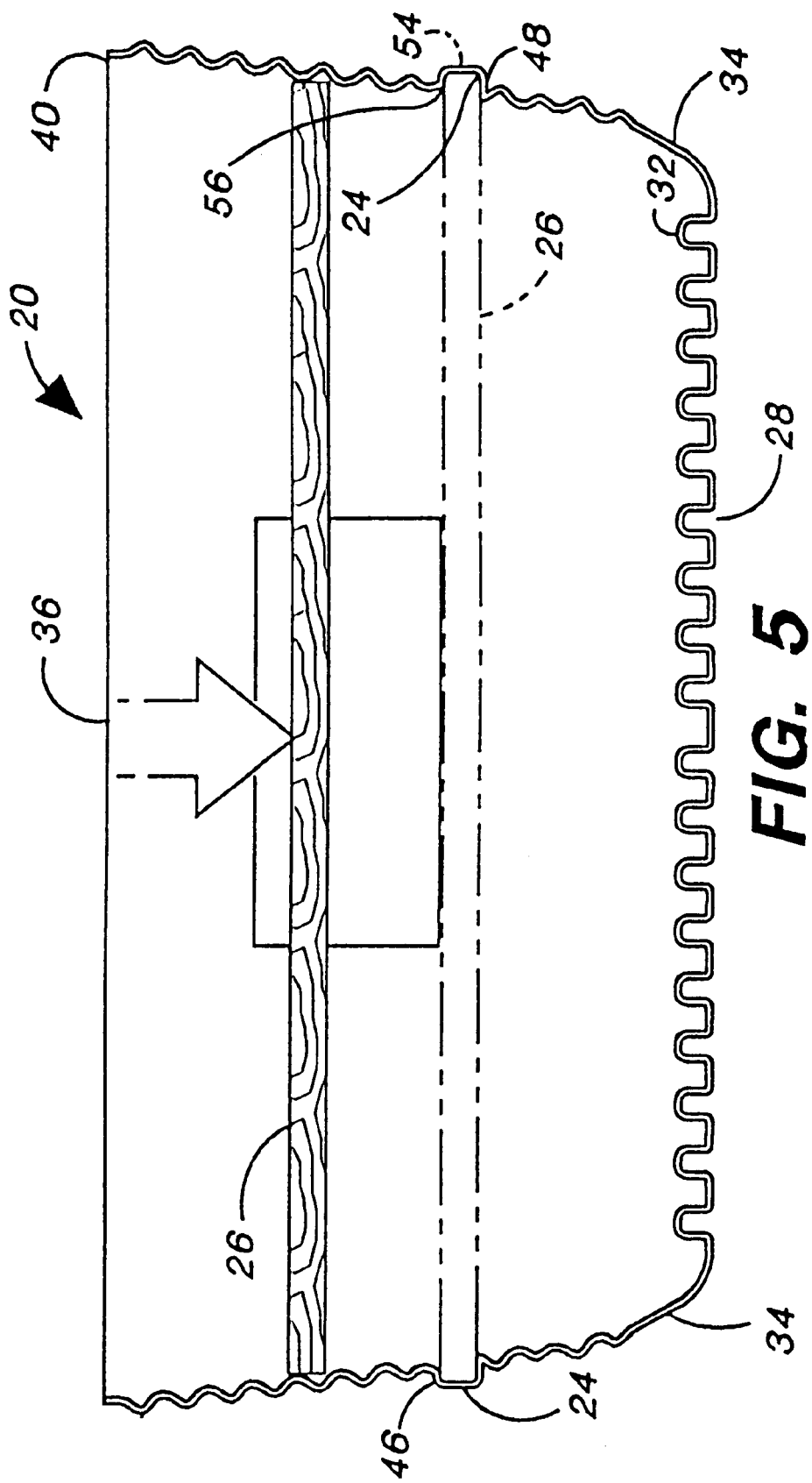
FIG. 5 is a cross-sectional view of the bedliner of FIG. 2 taken along section line 5—5 showing a load restraining member prior to insertion.

A restraint pocket 24, shown in FIGS. 2 and 3, is formed in each liner side wall 34 forward and rearward of the liner wheel well 44. The pockets 24 are positioned opposite one another as pairs. As shown in FIG. 5, each pair is adapted to receive a load restraining member 26 which may be a conventional 2×4 board or a specially formed divider. The load restraining member 26 extends transversely from one pocket 24 of the pair to the other to restrain the longitudinal movement of articles positioned within the bedliner 20. As best shown in FIG. 3, each pocket 24 is recessed into the bedliner side wall 34 and extends outwardly from the bedliner interior.

The pockets 24 are preferably positioned both forward of and rearward of the liner wheel well 44. It should be noted, however, that additional pockets may be provided to suit longer beds, or beds of differing configuration. In addition, as shown in FIG. 1, pockets 24 may be formed on the wheel wells 44 to receive shorter length load restraining members.

The bedliner 20 allows the bed of a truck to be selectively divided up for transportation of smaller, easily shiftable loads. These small loads may be positioned against the front wall 36 of the liner 20 and restrained from significant shifting by a load restraining member inserted in the front pair of pockets 24.

As shown in FIG. 2, each pocket 24 has a substantially horizontal upper segment 46, and a substantially horizontal lower segment 48 which extends beneath the upper segment. The upper segment is joined to the lower segment by two substantially semicylindrical side segments 50, such that a load restraining member 26 may be received between the upper and lower segments. The upper segment 46, the lower segment 48, and the two side segments 50 of the pocket 24 are joined to a pocket back segment 52. The pocket 24 is formed as an undercut portion on the thermoforming mold.

As shown in FIG. 5, the upper segments of the pockets 24 in a pair extend outwardly from the side walls 34 at a distance from one another which is less than the length of the load restraint member 26. To insert the load restraint member 26 one end of the member is inserted in a pocket 24, and a downward force is applied to the other end 54. This force causes the outward flexing of the bedliner side wall 34 to allow the end 54 to pass over the lip 56 defined between the side wall 34 and the pocket upper segment 46 and to snap into engagement with the pockets 24.

The engaged load restraint member 26 is limited in downward motion by the lower segment 48, and is kept from rotating out of the pocket 24 by the upper segment 46. The member 26 opposes its wider dimension to longitudinal motion of articles carried within the truck bed, and hence provides desirable stiffness and resistance to bending.

In a preferred embodiment the pockets 24 will be formed in the bedliner side walls 34 below the upper level of the bedliner wheel wells 44 to discourage use of the load restraint pockets 24 as pockets for supporting vertical load carrying boards, such as those which are commonly used for supporting a sheet of plywood or similar material within the truck bed. However, higher elevations of the pockets are acceptable if significant vertical loads are not placed on the members 26.

As shown in FIG. 1, the bedliner 20 is preferably provided with one or more load restraint pockets 58 formed on the bedliner front wall 36. Shorter length load restraint members 60 may be inserted in the front wall pockets to extend between the front wall 36 and a load restraint member 26 which extends between the side walls. The front wall pockets 58 are identical to the side wall pockets 24, yet allow the front of the bedliner 20 to be compartmentalized to accommodate smaller articles.

As shown in FIGS. 6, 7, 8, 9, and 11, the load restraint pockets of the bedliner of this invention may be formed in various shapes which embody the upper segment and lower segment of the pocket.

Figure 6:
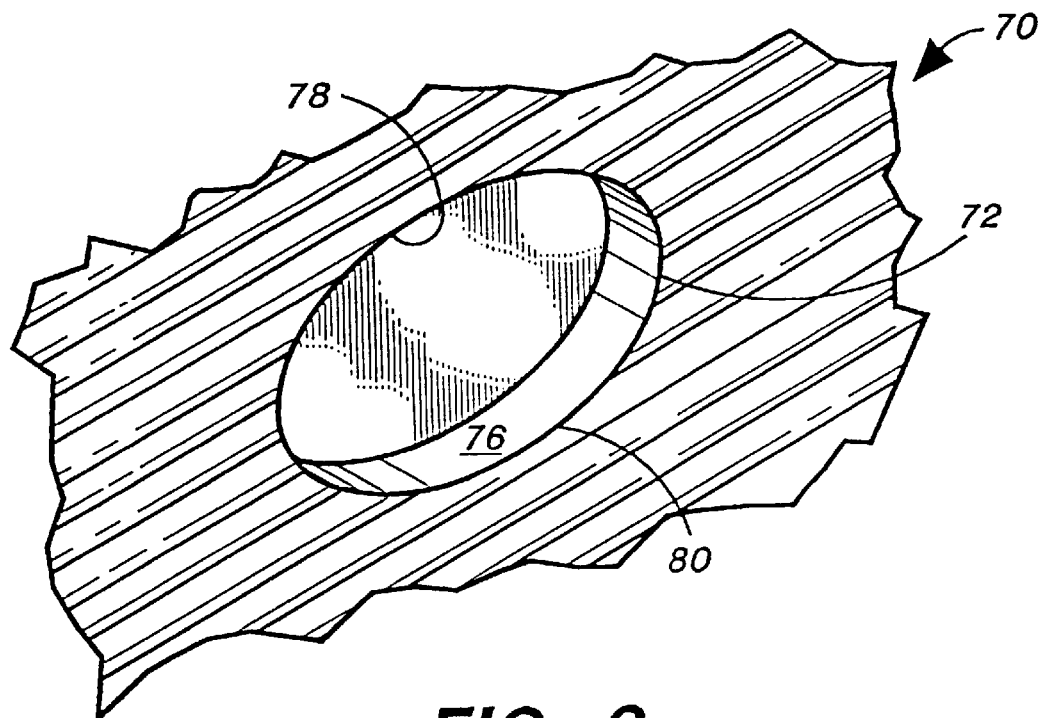
FIG. 6 is a fragmentary isometric view of an oval pocket of an alternative embodiment bedliner of this invention.

An alternative embodiment bedliner 70 has an oval pocket 72, as shown in FIG. 6. The pocket 72 has a pocket wall 76 which is generally oval in cross section. A curved upper segment 78 is defined by the upper portion of the pocket wall 76, and a curved lower segment 80 is defined by a lower portion of the pocket wall 76. The oval pocket 72 engages the load restraining member 26 only at the corners of the member.

Figure 7:
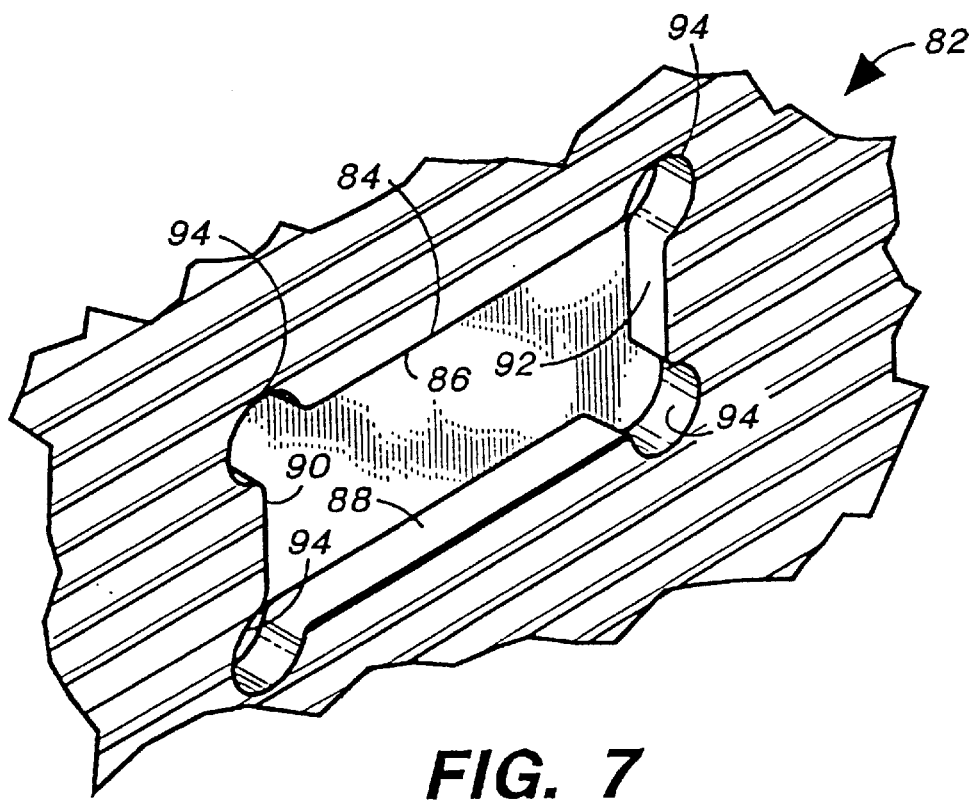
FIG. 7 is a fragmentary isometric view of a pocket with relieved corners of another alternative embodiment bedliner of this invention.

Another alternative embodiment bedliner 82 has a pocket 84 which does not engage the corners of the load restraining member 26 and hence avoids the potential wear at the contact lines between the sharp corners and the pocket. As shown in FIG. 7, the pocket 84 has an upper horizontal segment 86 which overlies a lower horizontal segment 88. A first side segment 90 and a second side segment 92 extend substantially vertically at a position between the upper and lower segments 86, 88. Semicylindrical corner segments 94 are defined between the upper segment 86 and the first and second side segments 90, 92, and between the lower segment 88 and the side segments. The semicylindrical corner segments 94 allow a load restraining member 26 which is inserted within a pocket to engage against the first side segment, the second side segment, the upper segment, or the lower segment without engaging the corner segments. Thus only the horizontal or vertical surfaces of the load restraining member 26 make contact with the pocket, avoiding possible abrasion from contact with member corners.

Figure 8:
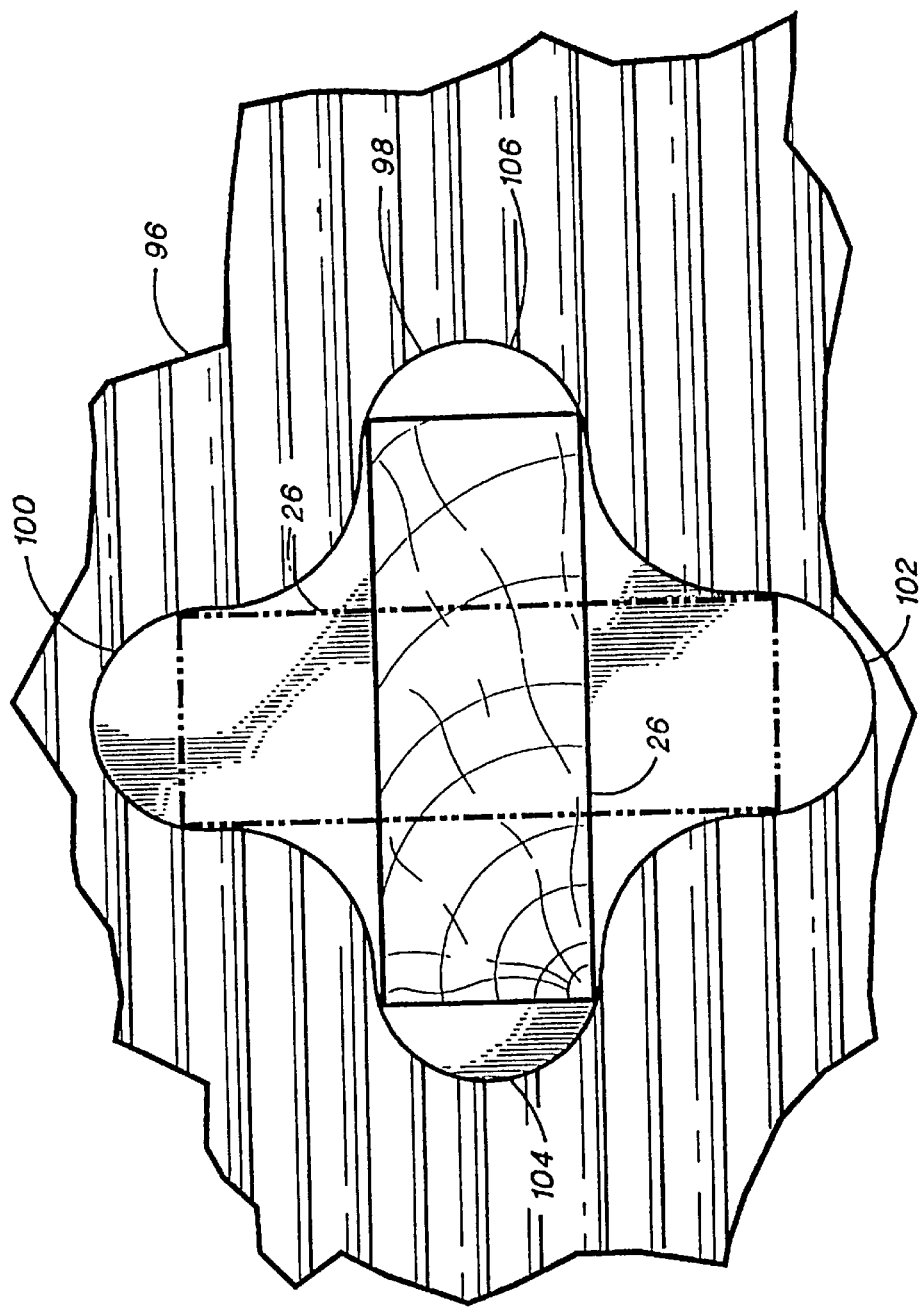
FIG. 8 is a fragmentary elevational view of a two position pocket of yet another alternative embodiment bedliner of this invention with a load restraining member shown inserted therein, and with an alternative position of said member shown in phantom view.

Yet another alternative bedliner 96 has pockets 98 which permit a load restraining member to be inserted in two positions, one in which the member 26 is oriented vertically, and one in which the member is oriented horizontally. As shown in FIG. 8, the pocket 98 has an upper segment 100 which is a generally semicylindrical downwardly opening wall, a lower segment 102 which is a generally semicylindrical upwardly opening wall positioned beneath the upper segment 100, and first and second side segments 104, 106 which are generally semicylindrical walls and opposed to one another.

The first side segment 104 and the second side segment 106 are located beneath the upper segment 100 and above the lower segment 102. A load restraining member 26 has a narrow dimension and a wide dimension. The orientation of the member may be determined by selectively positioning the member in the pocket 98 either between the upper and the lower segments 100, 102, or between the two side segments 104, 106. The member 26 will be disposed in a horizontal orientation when extending between the two side segments 104, 106, and will be disposed in a vertical orientation when disposed between the upper segment 100 and the lower segment 102.

Figure 10:
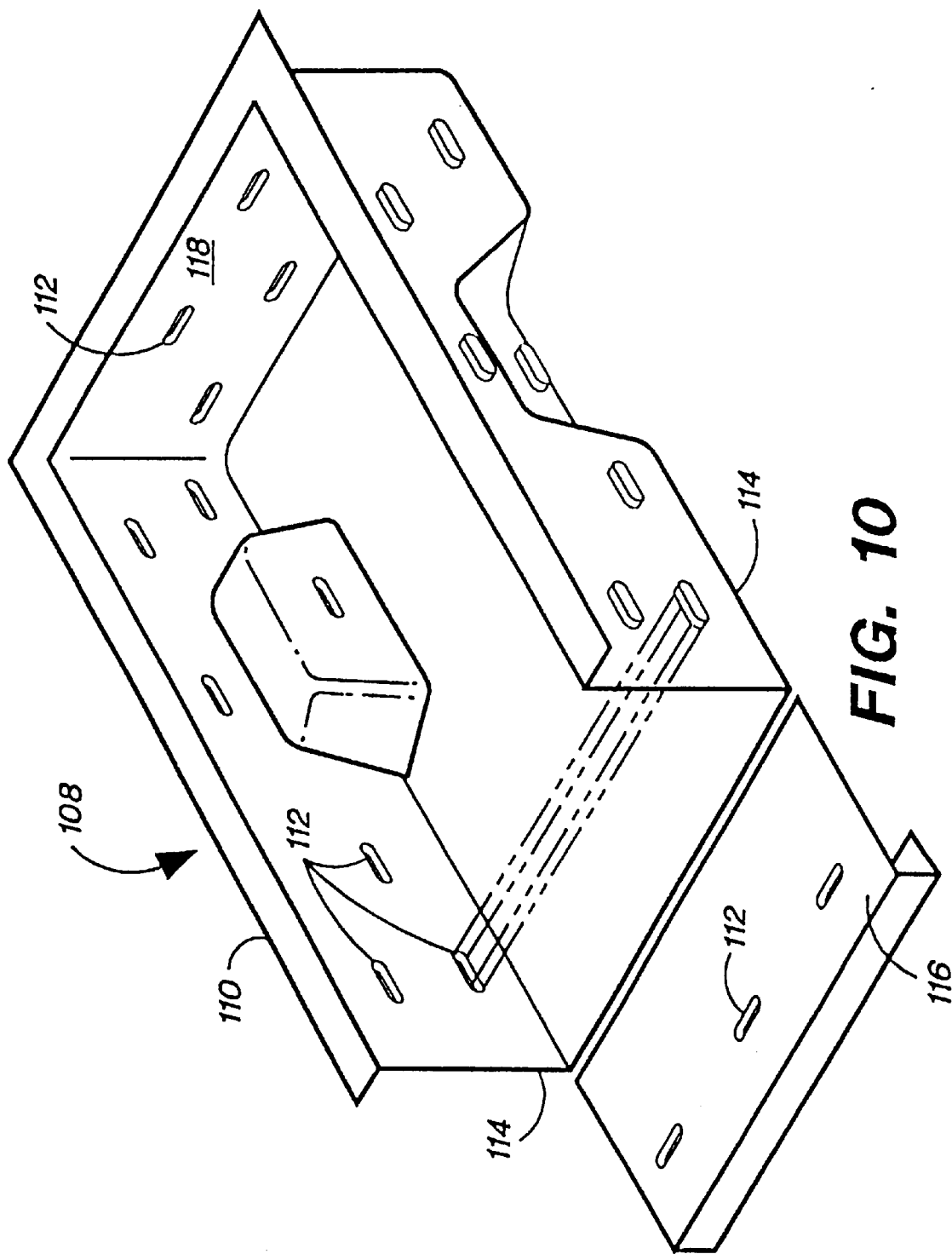
FIG. 10 is an isometric view of an over the rail bedliner of this invention having load restraining pockets at multiple levels and on the front wall and the tailgate cover.

As shown in FIG. 10, the snap-in load restraint pockets of this invention may also be provided in an over the rail bedliner 108. The bedliner 108 may be installed within the cargo bed of a pick-up truck and has unitary flanges or rails 110 which extend over and shield the side rails of the truck. The bedliner 108 has an array of load restraint pockets 112 similar to the pockets 24. The pockets 112 are disposed at different elevations along the bedliner side walls 114 to permit variable height positioning of the load restraining members 26. In addition, pockets 112 are formed on the tailgate liner 116 to allow load restraining members to be placed in a front-to-back orientation extending between the pockets 112 on the front wall 118 and pockets on the tailgate liner 116. The pockets 112 are sufficiently stiff, having connected upper and lower segments, that the positioning of a load restraint member within the pockets will not tend to unduly distort the rails of an over the rail liner.

Figure 9:
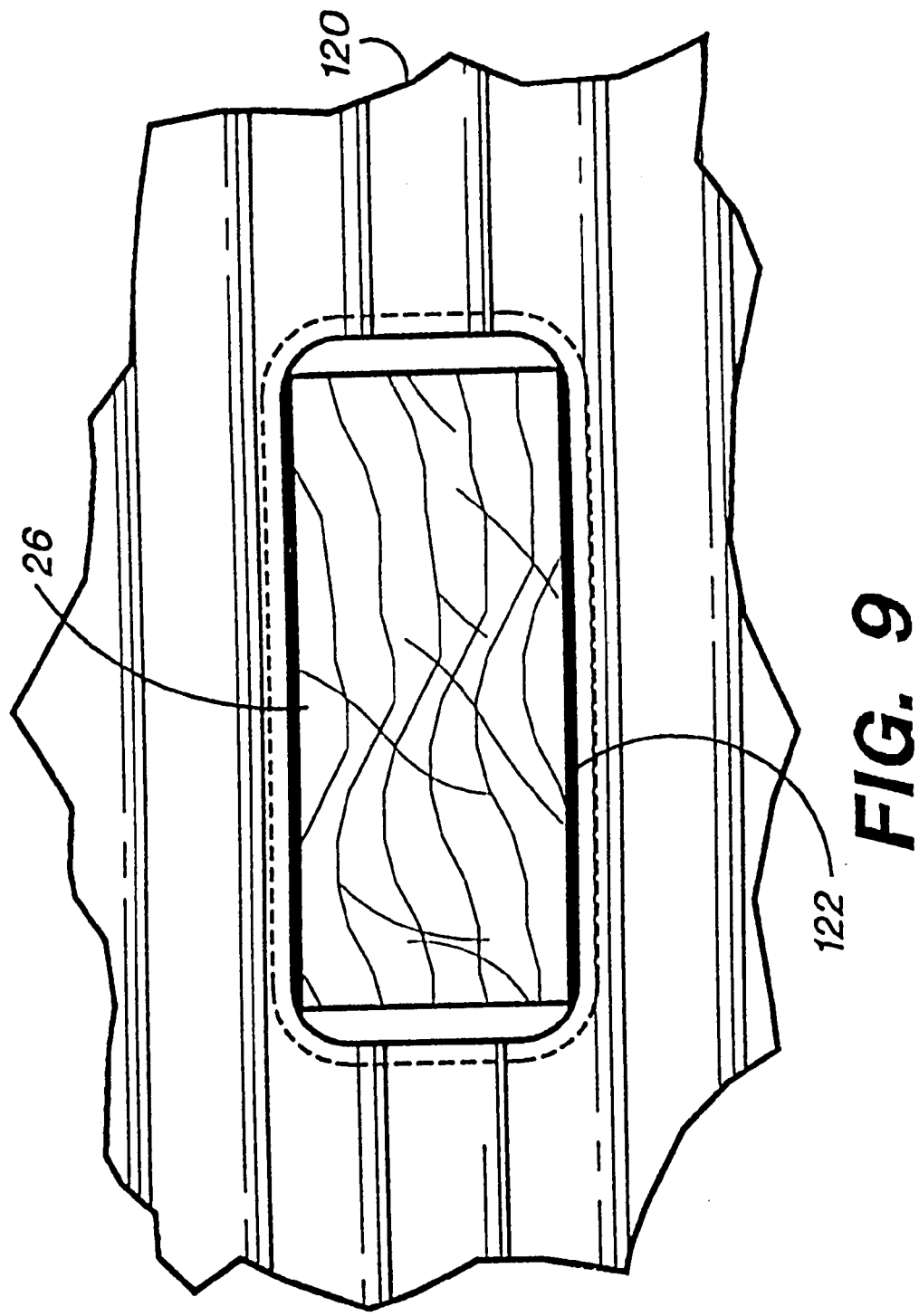
FIG. 9 is a fragmentary elevational view of another embodiment bedliner having a generally rectangular pocket.

An alternative embodiment bedliner 120 shown in FIG. 9, has a pocket 122 which is substantially rectangular with radiused corners to more closely engage a load restraining member 26.

Figure 11:
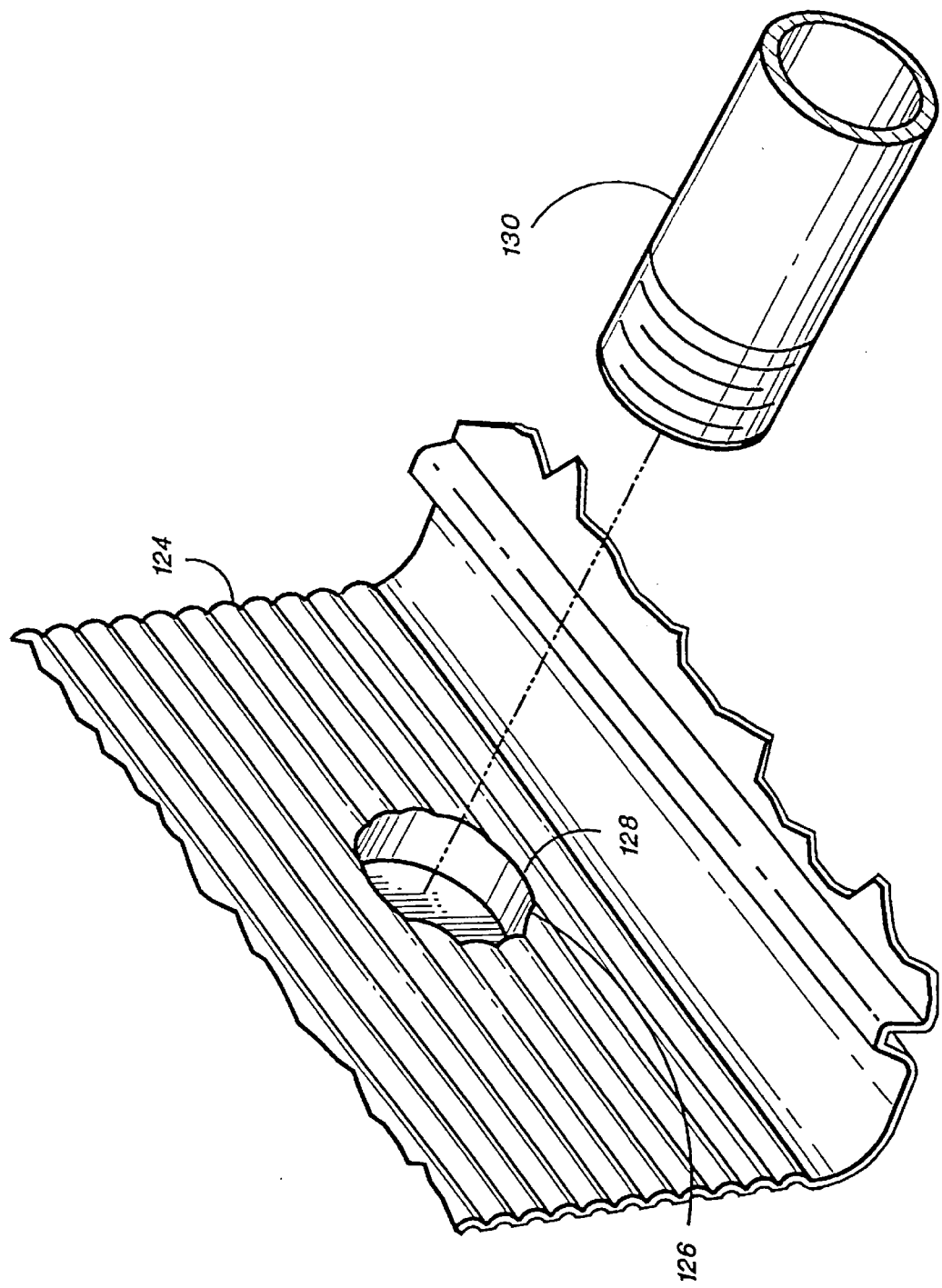
FIG. 11 is a fragmentary isometric view of another alternative embodiment bedliner having a circular load restraining pocket for receipt of a pipe shown exploded therefrom.

As shown in FIG. 11, another alternative embodiment bedliner 124 has pockets 126 which are generally circular with a cylindrical pocket wall 128. The cylindrical pocket wall 128 engages a cylindrical load restraining member such as a length of pipe 130.

The structure of the snap-in pockets of this invention may be selected depending on the particular needs of a desired application. Alternative side wall, lip, and pocket structure is shown in FIGS. 12–19. Pocket structure for outwardly inclined side wall bedliners is shown in FIGS. 12–15, Pocket structure for substantially vertical side wall bedliners is shown in FIGS. 16–19.

A bedliner 132 is shown in FIG. 12 which has an inclined side wall 134 having a pocket 136 which engages a standard timber load restraining member 26 which has perpendicular faces. The pocket 136 conforms generally to the shape of the member 26. The upper segment 138 of the pocket extends generally horizontally outwardly from the lip 140.

An alternative bedliner 142, shown in FIG. 13, has an inclined side wall 144 with a pocket 146 which engages a standard timber load restraining member 26 and which has an inclined upper segment 148. The inclination of the upper segment 148 of the pocket 146 facilitates entry of the load restraining member 26 into the pocket.

Figures 14, 15:
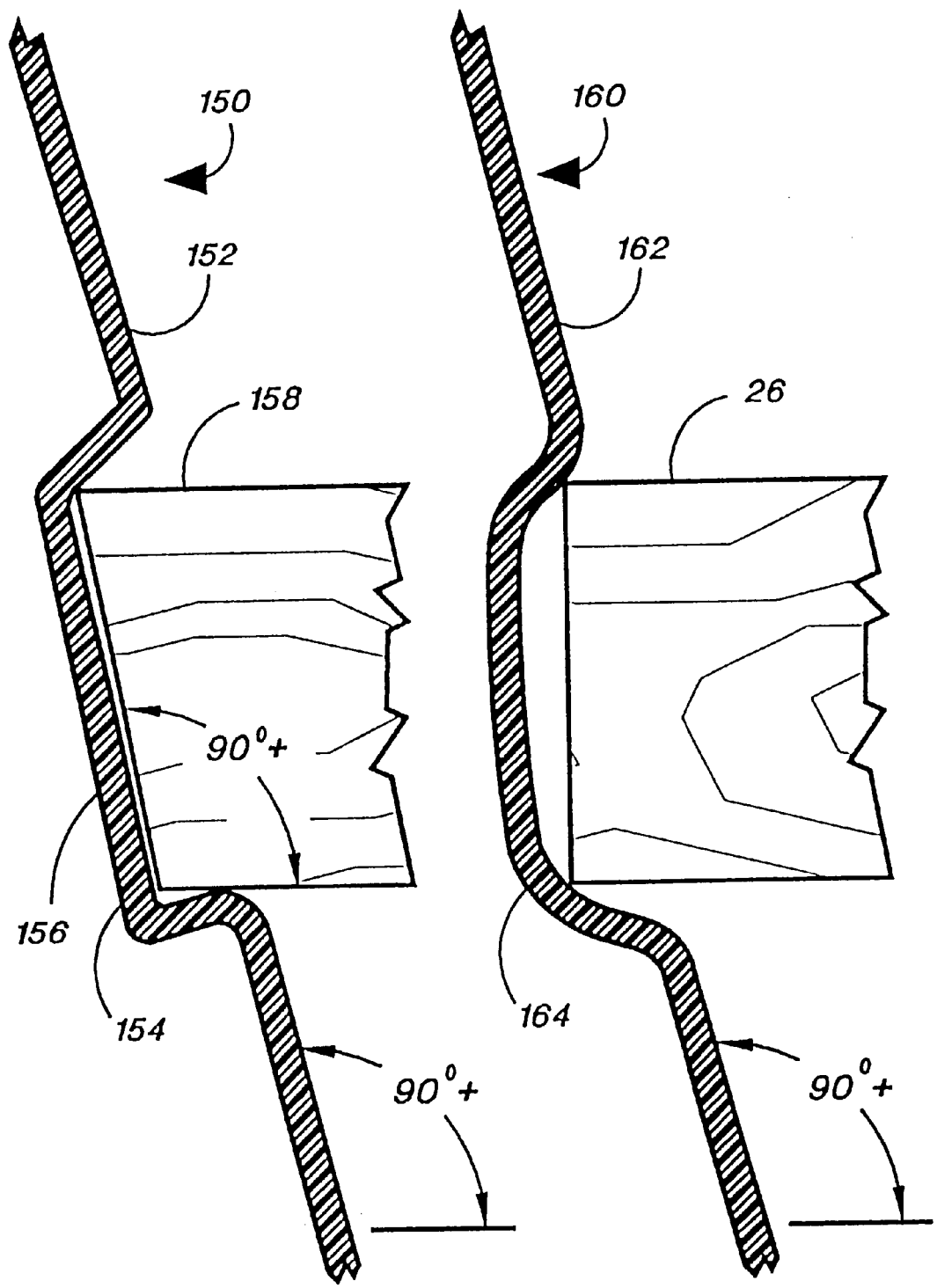

Another alternative bedliner 150, shown in FIG. 14, has an inclined side wall 152 and a pocket 154 having a rear wall 156 which shares the inclination of the side wall 152. The degree of undercut of the pocket 154 is reduced from that of a bedliner having a pocket with a vertical rear wall. The pocket 154 is designed to cooperate with specially formed load restraint members 158 which have ends cut off at an angle to be parallel to the pocket rear wall 156.

Yet another alternative bedliner 160, shown in FIG. 15, has an inclined side wall 162 with a pocket 164 with a wide radius. Wider radius structure is generally more uniform in thickness when thermoformed, and hence avoids any weakened lines or excessively thinned wall portions.

Figures 16, 17:
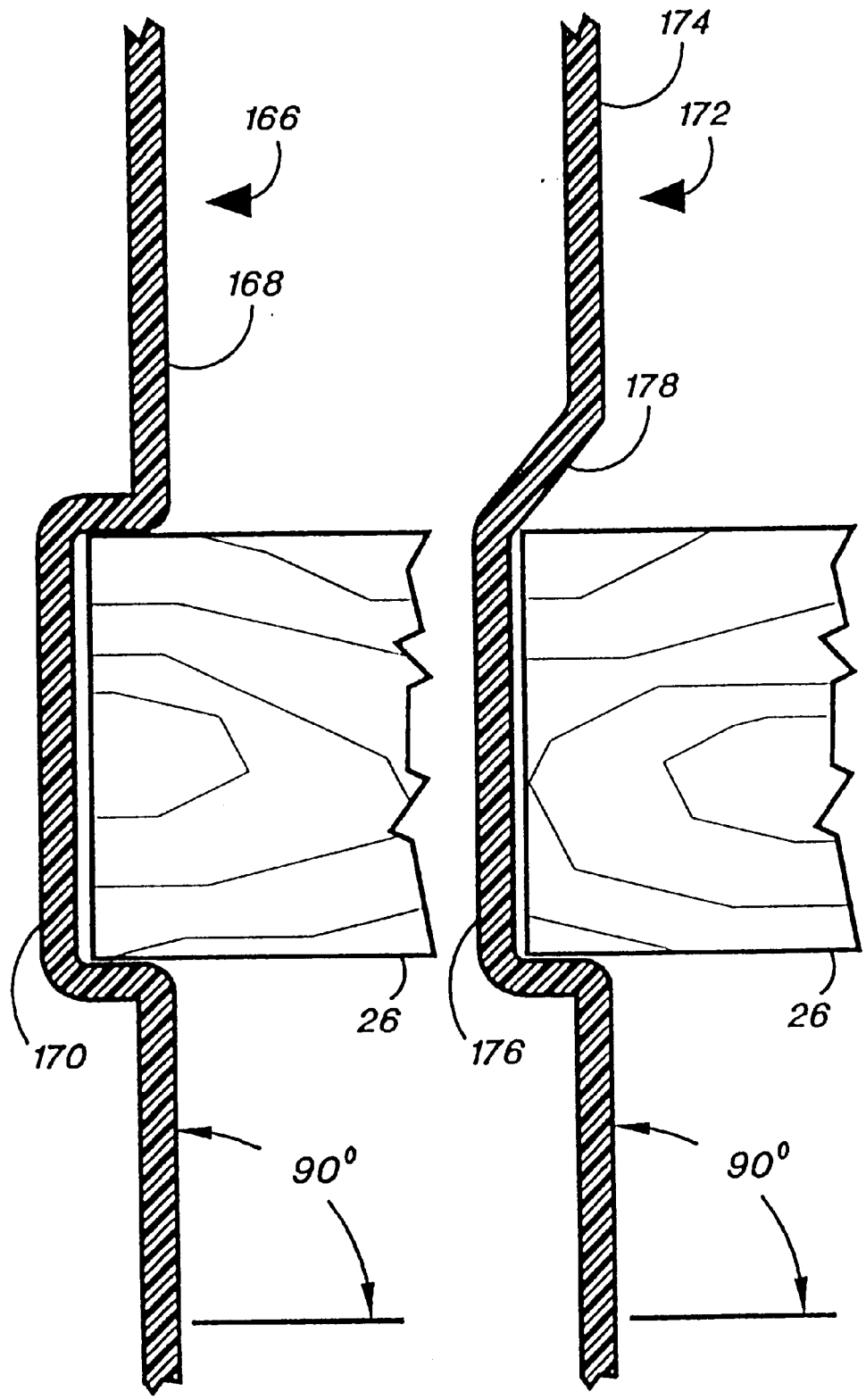

The bedliner 166, shown in FIG. 16, has a vertical side wall 168, with a pocket 170 which generally conforms to the standard timber restraining member 26.

The bedliner 172, shown in FIG. 17, has a vertical side wall 174, with a pocket 176 having an inclined upper segment 178.

Figures 18, 19:
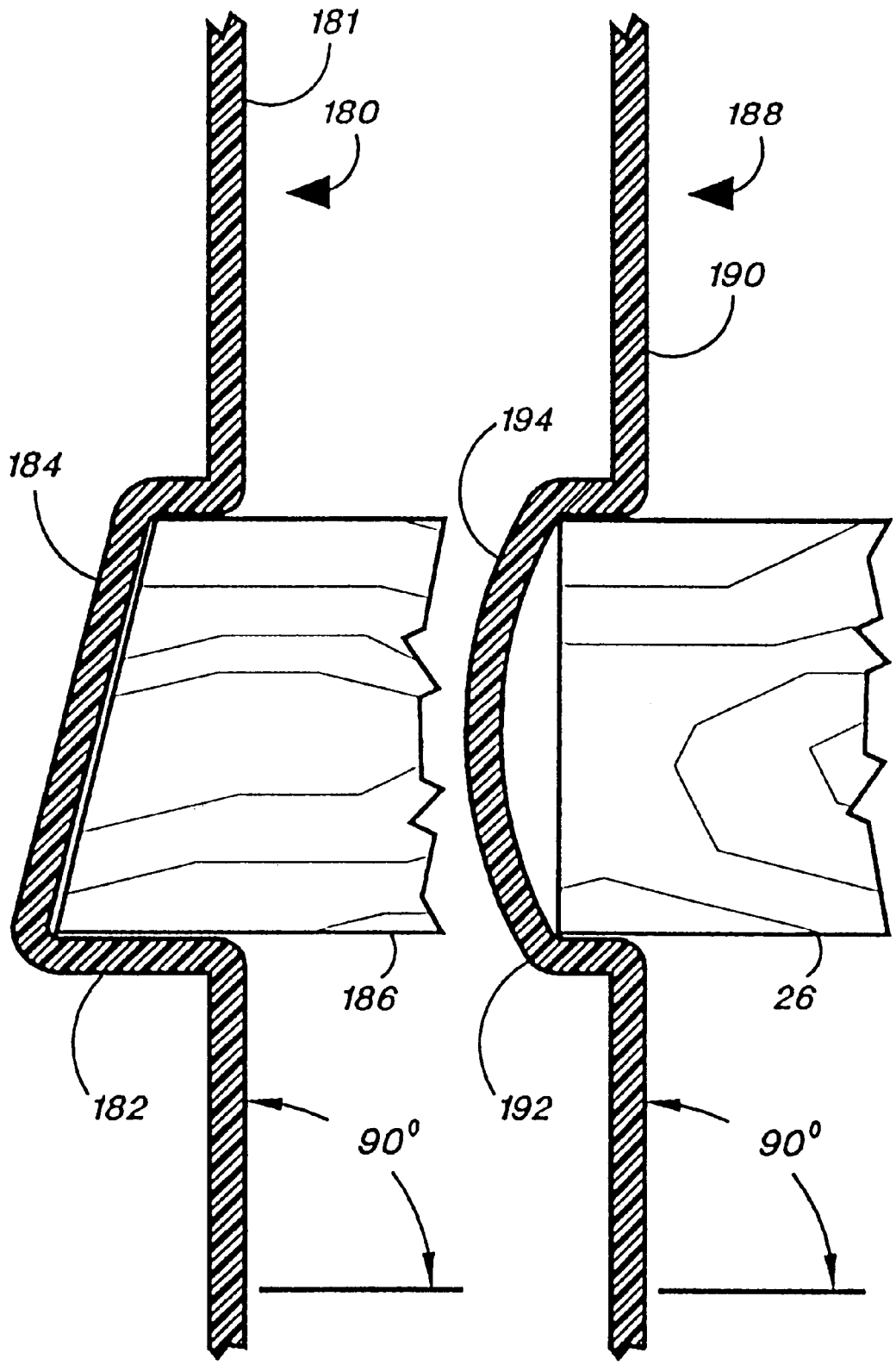

The bedliner 180, shown in FIG. 18, has a vertical side wall 181 with a deep under-cut pocket 182 which has a rear wall 184 which is angled inwardly and which engages with a specially cut load restraining member 186 which has inwardly sloping ends.

The bedliner 188, shown in FIG. 19, has a vertical side wall 190 having a pocket 192 with a wide-radiused rear wall 194 which engages a standard dimensioned timber load restraining member 26.

Figure 20:
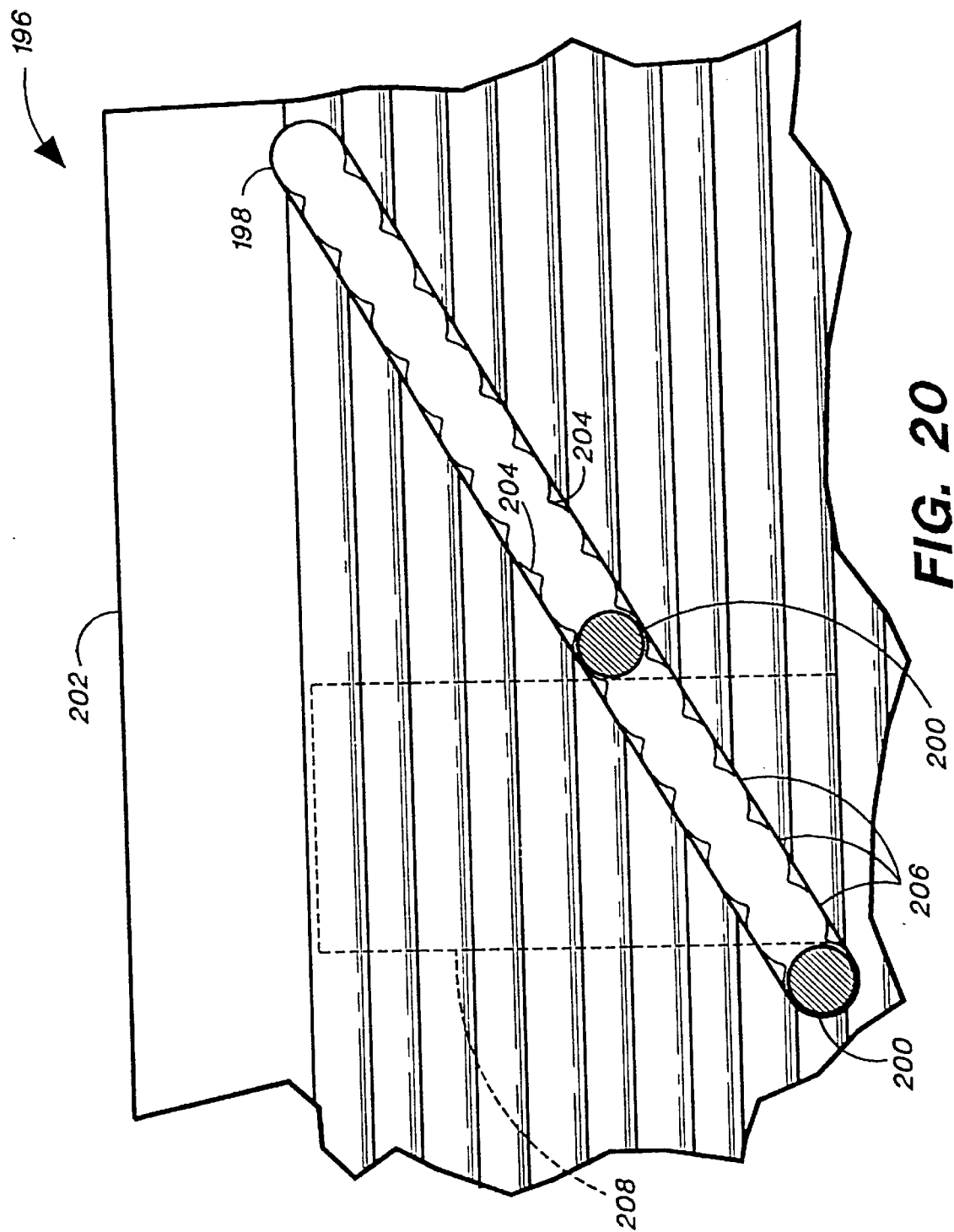
FIG. 20 is a fragmentary side elevational view of an alternative embodiment bedliner of this invention having an inclined strip for receiving cylindrical load restraining members in a plurality of positions.

An alternative bedliner 196 which has an elongated pocket 198 which accommodates multiple positions of a load restraining member 200 is shown in FIG. 20. The bedliner 196 has a side wall 202 with a single under-cut pocket 198 formed therein. The pocket 198 extends frontwardly along the side wall 202 and has a plurality of stops 204 which divide the pocket into a number of discrete member receiving openings 206. The openings 206 are positioned opposite similar openings in a pocket 198 on the opposite side wall 202 such that a load restraint member 200 may be positioned at a desired elevation or front-to-back position within the bedliner 196. With the multiple openings 206 a cargo element 208, for example a crate, may be secured between two load restraining members to limit the shifting of the cargo. The load restraining members 200 are illustrated as cylindrical dowels or pipes, but it should be noted that rectangular, square or other shape members may also be employed.

Figure 21:
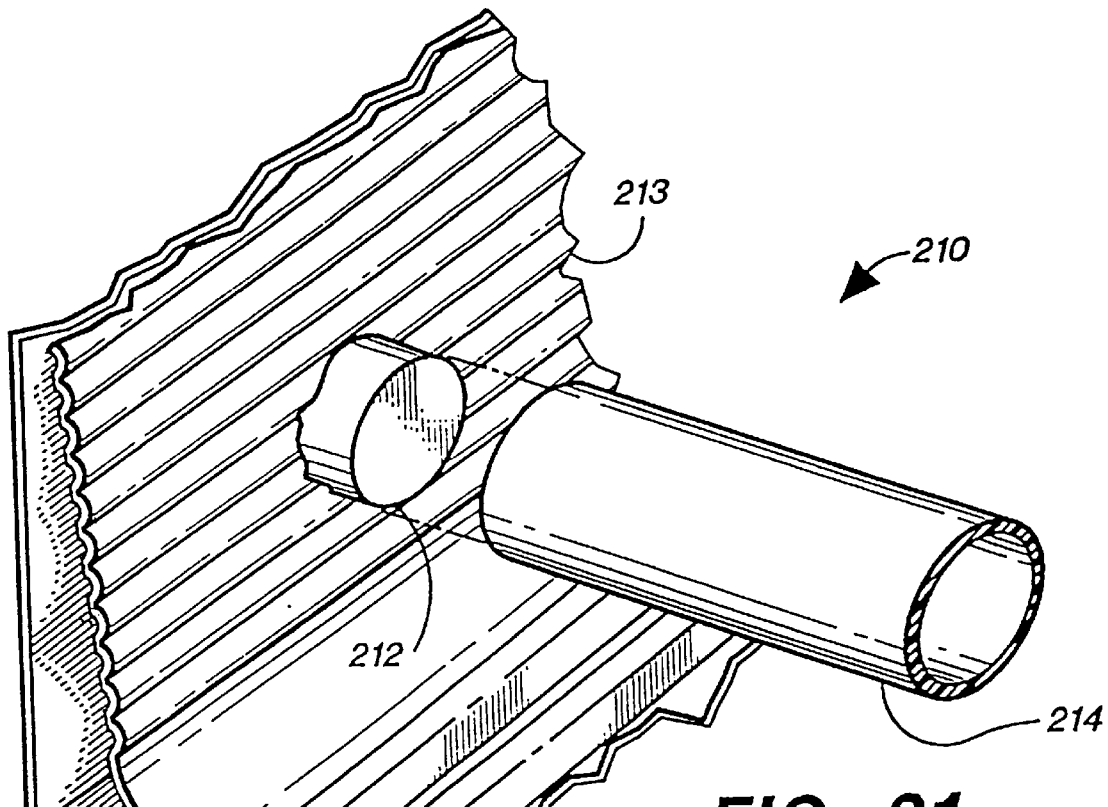
FIG. 21 is a fragmentary isometric view of an alternative embodiment bedliner of this invention having a protruding side wall portion for engaging a cylindrical pipe load retaining member.
Figure 22:
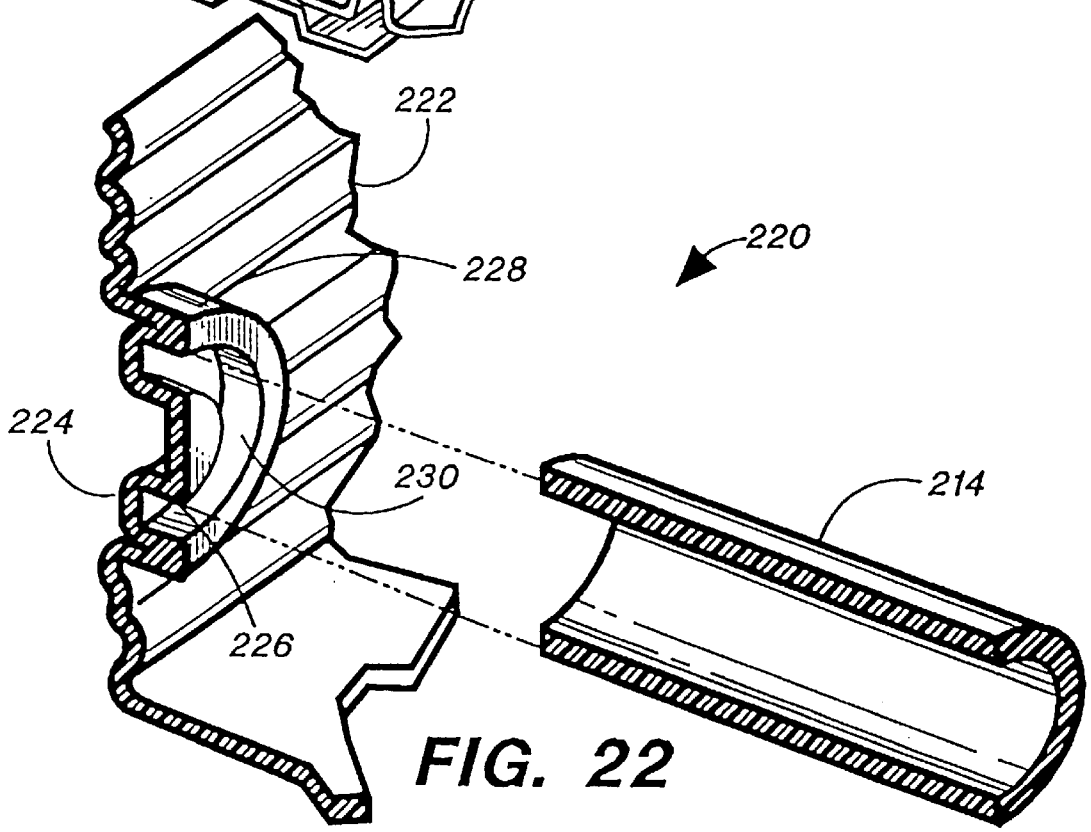
FIG. 22 is a fragmentary isometric view, broken away in section, of another alternative embodiment bedliner of this invention having protruding side wall portions for engaging a cylindrical pipe load retaining member.
Figure 23:
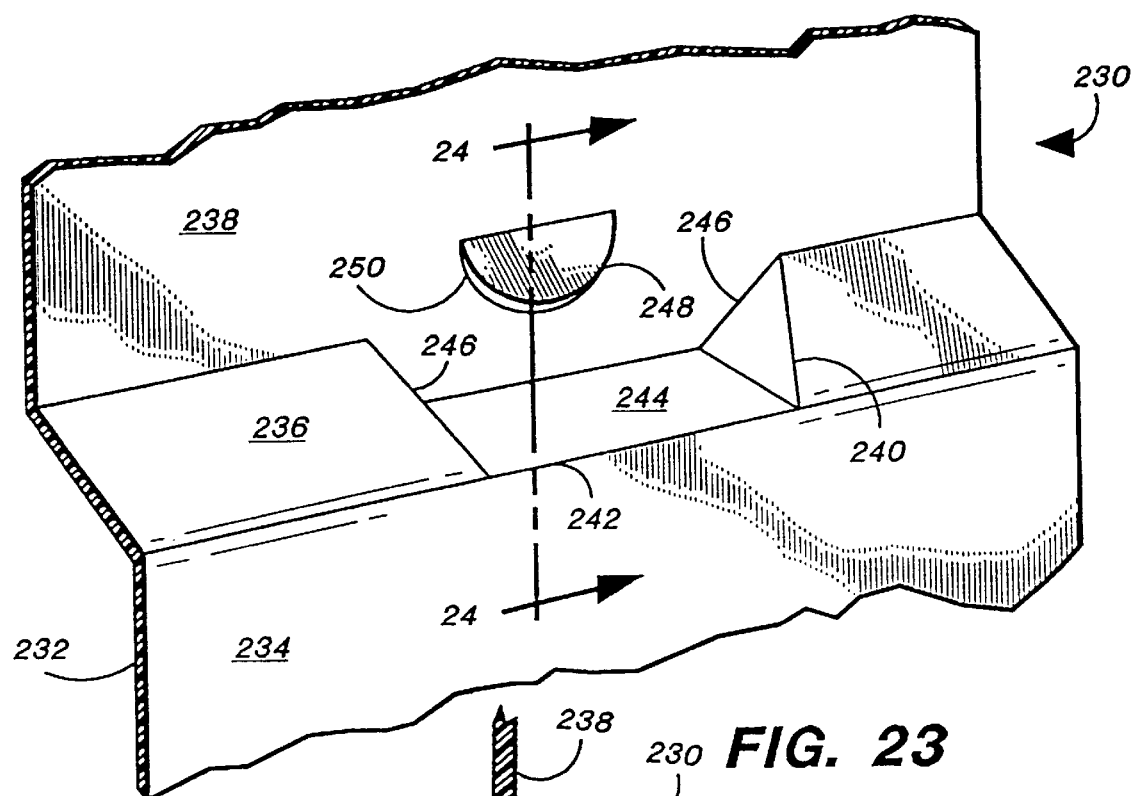
FIG. 23 is a fragmentary isometric view of an alternative embodiment bedliner sidewall of this invention having a projecting semicylindrical upper member.
Figure 24:
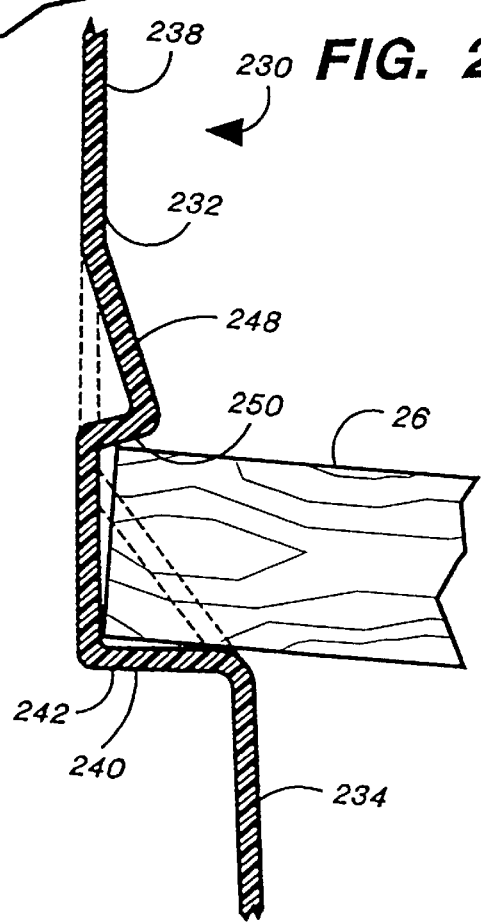
FIG. 24 is a cross-sectional view taken along section line 24—24 of the bedliner of FIG. 23.

Another alternative embodiment bedliner 210, shown in FIG. 21, has a protruding cylindrical shell 212 which extends inwardly from the side wall 213. The shell 212 engages within a cylindrical load retaining member 214 which is a hollow tube or pipe, for example a conventional length of PVC tubing, such as is used in plumbing applications. As in the bedliners described above, the cylindrical shells 212 are positioned opposite one another on the opposite side walls of the bedliner to allow the pipe member 214 to extend across the length of the bed to prevent shifting of cargo carried in a truck.

Yet another alternative embodiment bedliner 220 has side walls 222 with pockets 224 formed thereon which engage with hollow tube load retaining members 214. Each pocket 224 has a cylindrical inner wall 226 which engages against the inside of the tube member 214 and a cylindrical outer ring 228 which has a wall 230 which engages against the outside of the tube member 214. A circular groove 232 is defined between the wall 230 and the inner wall 226 which receives the tube member 214. The pipe member 214 is snapped into place in the bedliner 220, and is removed by deforming the bedliner side walls.

As shown in FIGS. 23–27, load restraining pockets may be formed in thermoformed bedliners having stepped sidewalls, such as those found in some under the rail bedliners. The bedliner 230 shown in FIGS. 23 and 24, has an upwardly extending side wall 232 with a first side wall section 234 which extends upwardly from the bedliner floor (not shown). A narrow inclined side wall section 236 extends upwardly and outwardly from the first section, and a second side wall section 238 extends upwardly from the inclined side wall section. A pocket 240 is formed on the side wall 232. The pocket has a lower segment 242 with a pocket floor 244 which engages a load restraining member 26. Two pocket side walls 246 extend upwardly from the pocket floor 244 and prevent front to back movement of the load restraining member 26. The pocket has an upper segment 248 which extends inwardly from the second side wall section 238 and which has a generally semicylindrical surface 250 which makes contact along a line with the load restraining member 26. The upper segment is spaced above the first side wall section 234 and the pocket floor 244 approximately the thickness of the load restraining member 26 to engage the member and prevent it from being displaced vertically.

An alternative bedliner 260, shown in FIG. 25, is similar to the bedliner 230, but has instead a pocket 261 with an upper segment 262 which has a substantially horizontal surface 263 which faces downwardly and makes surface contact with a load restraining member engaged on the pocket lower segment 264.

Another alternative bedliner 270, shown in FIGS. 26 and 27, has a side wall 272 with a first section 274, an inclined section 276, and a second section 278 which extends upwardly from the inclined section. A pocket 280 is formed in the side wall 272 with a lower segment 282 which is recessed from the first sidewall section 274. The pocket 280 has a pocket floor 284 which is recessed below the inclined side wall section 276. The upper segment 286 of the pocket is a horizontal planar wall which extends outwardly from the second side wall section 278 and which engages against the load restraining member 26 to hold it in place.

Figure 28:
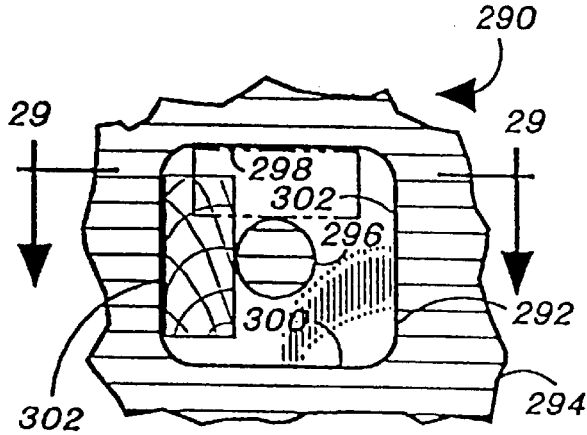
FIG. 28 is a fragmentary front elevational view of the side wall of an alternative embodiment bedliner of this invention having a four-position board holder pocket.
Figure 29:
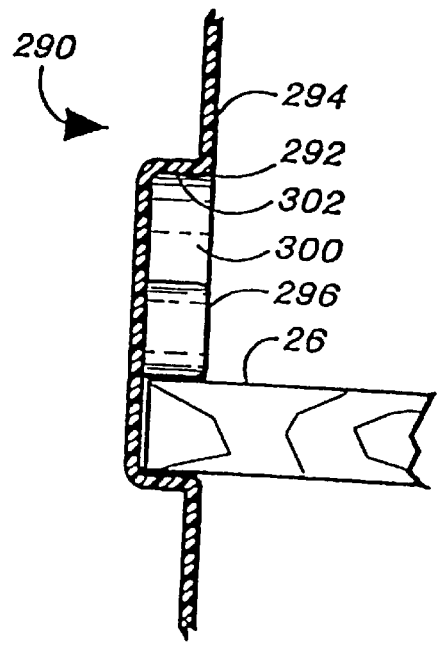
FIG. 29 is a cross-sectional view of the board holder pocket of FIG. 28 taken along section line 29—29.

Alternative embodiment multiple position pocket configurations are shown in FIGS. 28–33. A bedliner 290, shown in FIGS. 28 and 29, has a four position pocket 292 which is recessed from the bedliner side wall 294 and which has a protruding cylindrical core 296 which extends to the level of the side wall 294. The pocket has a downwardly facing horizontal upper segment 298, an upwardly facing horizontal lower segment 300, and generally vertical side walls 302 which extend between the upper segment and the lower segment. The upper segment 298, the side walls 302, and the lower segment are joined by radiused portions of the pocket. As shown in FIG. 28, the pocket 292 accepts a load restraining member 26 in a position above or below the core 296, or in a position on either side of the core. It should be noted that a square core may be employed which would make surface contact with the engaged load restraining member.

Figure 30:
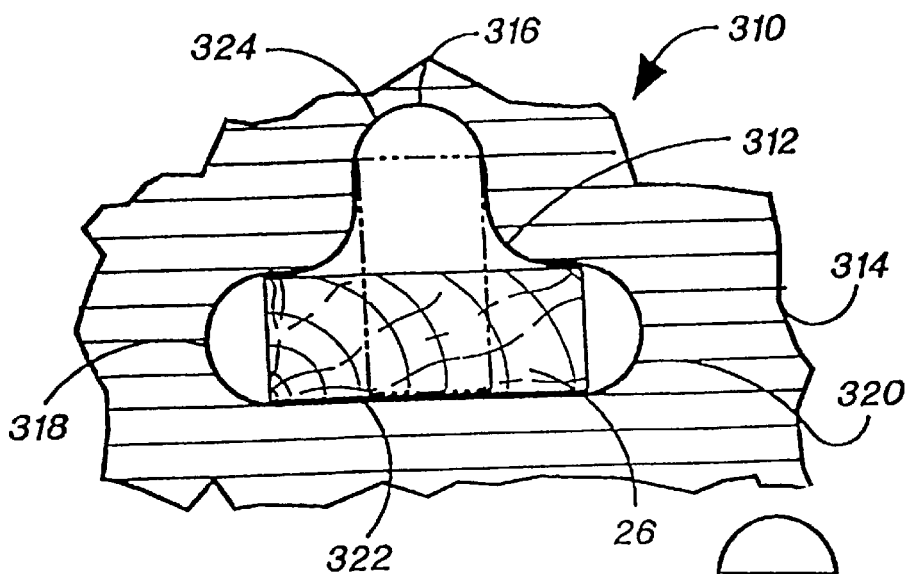
FIG. 30 is a fragmentary front elevational view of the side wall of an alternative embodiment bedliner of this invention having a two-position board holder pocket.

An alternative bedliner 310, shown in FIG. 30 has a pocket 312 which engages a load restraining member 26 in one of two positions. The pocket 312 is recessed from the bedliner side wall 314 and has three lobes 316, 318, 320. The upper lobe 316 receives the load restraining member when it is positioned with its wide dimension extending upwardly. Two side lobes 318, 320 receive the load restraining member 26 when it is positioned with its wide dimension extending sidewardly. The pocket has a lower segment 322 which is substantially horizontal and which is defined by the side lobes 318 and 320. The lower segment engages the load restraining member 26 in either position. The pocket has an upper segment 324 which is defined by the upper lobe 316 and downwardly facing portions of the two side lobes 318, 320. The upper lobe part of the upper segment 324 engages the member 26 in its vertical orientation, and the side lobe parts of the upper segment engage the member in its horizontal orientation. It should be noted that the three lobe pocket may be formed in a bedliner side wall in four orientations: the orientation shown, flipped about a horizontal axis, and rotated 90 degrees and 370 degrees.

Figure 31:
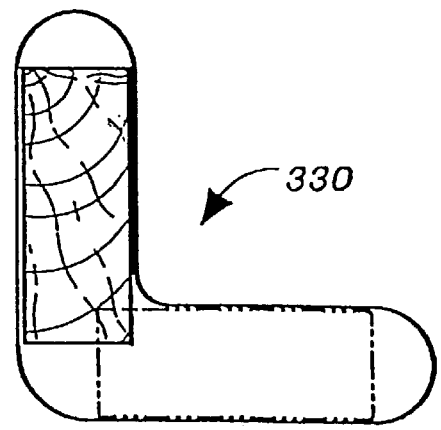
FIG. 31 is a schematic view of an alternative embodiment two-position board holder pocket for a bedliner of this invention.

Another alternative bedliner pocket 330 is shown in FIG. 31. The pocket 330 has an "L"-shaped configuration to accept a load restraining member 26 in a horizontal or vertical orientation. The pocket 330 may be formed on a bedliner side wall as shown in FIG. 31, or rotated in orientation 90, 180, or 370 degrees.

An alternative embodiment bedliner 340, shown in FIG. 32, has a serpentine multiple position pocket 342 which may accommodate multiple boards in either horizontal or vertical orientations. The serpentine pocket 342 has a plurality of upper segments 344 separated by downwardly extending cores 346 which are spaced above lower segments 348 which are separated by upwardly extending cores 350.

Another alternative embodiment bedliner 360, shown in FIG. 33, has a plurality of horizontally aligned structures similar to the pocket 362, shown in FIG. 8. The bedliner 360 has a multiple board engaging pocket 362 with an undulating upper segment 364 spaced above an undulating lower segment 368 which is a mirror image of the upper segment. Both segments 364, 368 have vertically extending lobes 370 which are joined by generally horizontal portions 372 with vertically extending stops 374. The pocket 98 thus receives boards 26 vertically between the vertically extending lobes 370 of the opposed upper and lower segment 364, 368, and receive horizontal boards between the horizontal portions 372, with horizontal motion of the boards 26 restricted by the stops 374.

All the bedliners of this invention may be provided with a plurality of load restraining member engaging features positioned at various elevations and longitudinal positions to serve a particular application.

Although the bedliners of this invention have been illustrated as incorporating a horizontal side wall rib pattern which is a registered trademark of Penda Corporation, the pockets and load restraining structure of this invention may also be used on side walls with some other pattern, or with no pattern.

It should be noted that bedliners of the present invention may be formed to be utilized with a wide variety of conventional truck beds, in which case the molded liner may take on a general shape which conforms to the dimensions of the particular bed.

It is understood that the invention is not confined to the particular construction and arrangement of parts herein illustrated and described, but embraces all such modified forms thereof as come within the scope of the following claims.

We claim:

1. A unitary thermoformed thermoplastic truck bedliner for mounting within a vehicle cargo bed having an upwardly extending side wall, the liner comprising:

a bottom wall;

two side walls positioned outwardly of the bottom wall which are formed as a single piece with the bottom wall and which extend upwardly from opposite sides of the bottom wall, a bed interior being defined between the side walls and above the bottom wall; and portions of each bedliner side wall which define at least one inwardly extending protrusion which has cylindrical portions which engage with a cylindrical load restraining member, each cylindrical portion being a shell which protrudes into the bed interior from one of the two side walls, and being formed in one piece with the bed side wall from which it extends, wherein at least one cylindrical portion is formed in each side wall, and wherein the cylindrical portions on the two side walls are positioned opposite one another as pairs, each pair being adapted to receive a cylindrical load restraining member which extends transversely from one cylindrical portion of the pair to the other to restrain the longitudinal movement of articles positioned within the bedliner.

2. The bedliner of claim 1 wherein the bedliner has a front wall extending upwardly from the bottom wall between the side walls, and wherein portions of the front wall define at least one load restraint pocket facing rearwardly, and further comprising:

a tailgate cover positioned rearwardly of the liner front wall and adapted to cover the tailgate of a truck; and portions of the tailgate cover which define a frontwardly opening load restraint pocket which is positioned opposite the front wall load restraint pocket to engage a load restraint member therebetween.

3. The bedliner of claim 1 further comprising an outer annular ring which surrounds each cylindrical protrusion to define a circular groove into which a load restraining cylindrical tube extends.

4. A unitary thermoformed thermoplastic truck bedliner for mounting within a vehicle cargo bed having an upwardly extending side wall, the liner comprising:

a bottom wall;

two side walls positioned outwardly of the bottom wall and which extend upwardly from opposite sides of the bottom wall, the side walls being formed integrally with the bottom wall, and the side walls being capable of outward flexing with respect to the bottom wall to which they are attached, and wherein a bed interior is defined above the bottom wall and between the two side walls; and portions of each bedliner side wall which define at least one load restraint pocket which extends inwardly into the bed interior from the side wall and has a cylindrical wall which extends into a cylindrical load restraining tube, such that the load restraining tube is supported on said cylindrical pocket wall, and wherein at least one pocket is formed in each side wall, and wherein the pockets on the two side walls are positioned opposite one another as pairs, each pair being adapted to receive a load restraining tube which extends transversely from one pocket of the pair to the other to restrain the longitudinal movement of articles positioned within the bedliner.

5. A unitary thermoformed thermoplastic truck bedliner for mounting within a vehicle cargo bed having an upwardly extending side wall, the liner comprising:

a bottom wall;

two side walls positioned outwardly of the bottom wall and which extend upwardly from opposite sides of the bottom wall; and portions of each bedliner side wall which define at least one load restraint pocket, wherein each pocket extends inwardly from the side wall and has a cylindrical wall which engages with a cylindrical load restraining tube, such that the load restraining tube is supported on said cylindrical pocket wall, and wherein at least one pocket is formed in each side wall, and wherein the pockets on the two side walls are positioned opposite one another as pairs, each pair being adapted to receive a load restraining tube which extends transversely from one pocket of the pair to the other to restrain the longitudinal movement of articles positioned within the bedliner, wherein the pocket further comprises an outer ring which surrounds the pocket cylindrical wall, wherein the ring has a second cylindrical wall which is spaced radially outwardly from the pocket cylindrical wall to define a circular groove into which a load restraining cylindrical tube extends.

6. A unitary thermoformed thermoplastic truck bedliner for mounting within a vehicle cargo bed having an upwardly extending side wall, the bedliner comprising:

a bottom wall;

two side walls which extend upwardly from opposite sides of the bottom wall, the side walls being formed with the bottom wall and extending therefrom to define a bed interior above the bottom wall and between the two side walls; and portions of each bedliner side wall which define at least one load restraint pocket, wherein each pocket has a protruding cylindrical shell with a cylindrical exterior surface which projects into bed interior, each pocket cylindrical shell extending into the bed interior to extend into a tubular load restraining member, and wherein at least one pocket is formed in each side wall, and wherein the pockets on the two side walls are positioned opposite one another as pairs, each pair being positioned to receive opposite ends of a load restraining member which extends transversely from one pocket of the pair to the other to restrain the longitudinal movement of articles positioned within the bedliner, the bedliner sidewalls being outwardly flexible to receive on the protruding shells a tubular load restraining member which is longer than the distance between the two pockets in a pair.

7. A unitary thermoformed thermoplastic truck bedliner for mounting within a vehicle cargo bed having an upwardly extending side wall, the bedliner comprising:

a bottom wall;

two side walls which extend upwardly from opposite sides of the bottom wall;

portions of each bedliner side wall which define at least one load restraint pocket, wherein each pocket has a protruding cylindrical shell such that a tubular load restraining member may be received and engaged with the protruding shell, and wherein at least one pocket is formed in each side wall, and wherein the pockets on the two side walls are positioned opposite one another as pairs, each pair being positioned to receive opposite ends of a load restraining member which extends transversely from one pocket of the pair to the other to restrain the longitudinal movement of articles positioned within the bedliner; and a cylindrical outer ring which protrudes from the bedliner side wall and which encircles the cylindrical shell, a circular groove being defined between the cylindrical shell and the outer ring, the load restraining member being received within the circular groove.

* * * * *